(12) United States Patent
Kowalski

(10) Patent No.: US 9,516,109 B2
(45) Date of Patent: *Dec. 6, 2016

(54) REGISTRY SYNCHRONIZER AND INTEGRITY MONITOR

(71) Applicant: BMC SOFTWARE, INC., Houston, TX (US)

(72) Inventor: Vincent Joseph Kowalski, Houston, TX (US)

(73) Assignee: BMC SOFTWARE, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,964

(22) Filed: Feb. 18, 2016

(65) Prior Publication Data

US 2016/0164971 A1 Jun. 9, 2016

Related U.S. Application Data

(63) Continuation of application No. 13/341,171, filed on Dec. 30, 2011, now Pat. No. 9,300,624.

(51) Int. Cl.
| | |
|---|---|
| *G06F 15/173* | (2006.01) |
| *H04L 29/08* | (2006.01) |
| *G06F 9/445* | (2006.01) |
| *H04L 29/12* | (2006.01) |
| *G06F 17/30* | (2006.01) |

(52) U.S. Cl.
CPC ....... *H04L 67/1095* (2013.01); *G06F 9/44505* (2013.01); *G06F 17/30371* (2013.01); *H04L 61/1541* (2013.01)

(58) Field of Classification Search
CPC .......................... H04L 61/1541; G06F 9/44505

USPC ......................................................... 709/223
See application file for complete search history.

(56) References Cited

U.S. PATENT DOCUMENTS

| | | | | |
|---|---|---|---|---|
| 6,374,294 | B1 * | 4/2002 | Quirt | H04L 29/06 709/221 |
| 8,843,903 | B1 * | 9/2014 | Blaser | G06F 8/61 717/135 |
| 8,886,628 | B1 * | 11/2014 | Taswell | G06F 17/3089 707/707 |

(Continued)

OTHER PUBLICATIONS

Wikipedia, Retrived on Dec. 24, 2011, Available at: http://en.wikipedia.org/wiki/Web_service.

*Primary Examiner* — Richard G Keehn
(74) *Attorney, Agent, or Firm* — Brake Hughes Bellermann LLP

(57) ABSTRACT

According to one general aspect, a method may include determining the validity of a registry entry, wherein the registry entry is included in a deleted items registry, the deleted items registry including registry entries previously determined to be invalid. Upon determining the registry entry is valid, moving the registry entry to a valid items registry, and upon determining the registry entry is invalid, determine if the registry entry has been invalid more than a threshold number of times, upon determining the registry entry has not been invalid more than the threshold number of times, increase a period of time before a next determination as to whether the registry entry in the deleted items registry is valid, and upon determining the registry entry has been invalid more than the threshold number of times, remove the second registry entry from the deleted items registry.

18 Claims, 4 Drawing Sheets

(56) References Cited

U.S. PATENT DOCUMENTS

| | | | |
|---|---|---|---|
| 2005/0086666 A1* | 4/2005 | Nason | G06F 21/82 719/321 |
| 2006/0075381 A1* | 4/2006 | Laborczfalvi | G06F 9/468 717/100 |
| 2007/0067321 A1* | 3/2007 | Bissett | G06F 9/5027 |
| 2009/0106780 A1* | 4/2009 | Nord | G06F 9/5077 719/329 |
| 2009/0165142 A1* | 6/2009 | Adelstein | G06F 21/55 726/26 |
| 2010/0153696 A1* | 6/2010 | Beachem | G06F 9/4406 713/2 |
| 2010/0235514 A1* | 9/2010 | Beachem | G06F 21/57 709/227 |
| 2011/0173607 A1* | 7/2011 | Murphey | G06F 8/71 718/1 |
| 2011/0314346 A1* | 12/2011 | Vas | H04L 63/06 714/49 |
| 2012/0124573 A1* | 5/2012 | Mamtani | A63F 13/12 718/1 |
| 2013/0173770 A1 | 7/2013 | Kowalski | |

\* cited by examiner

200

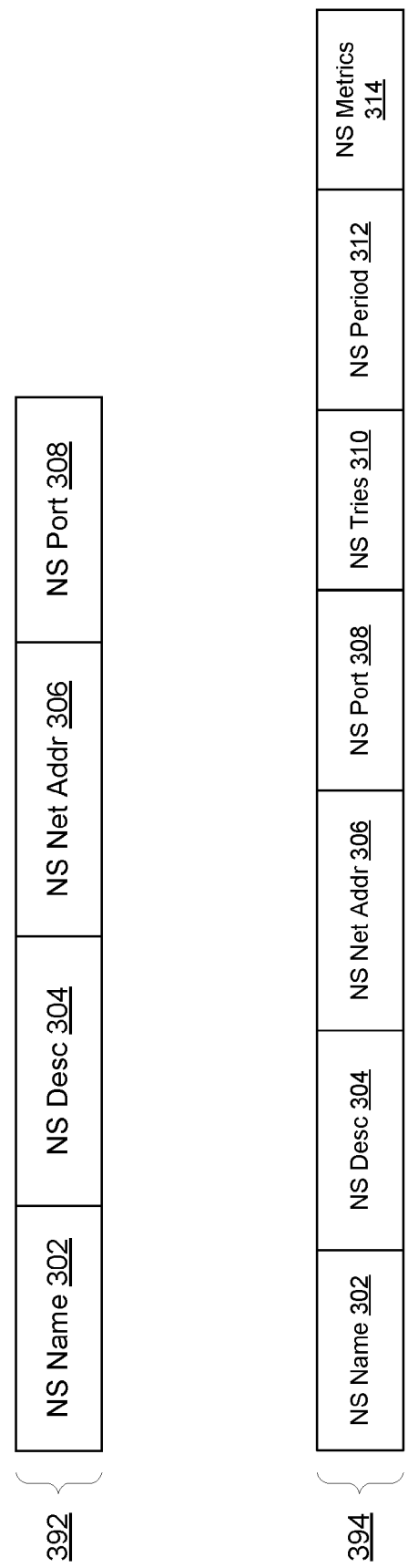

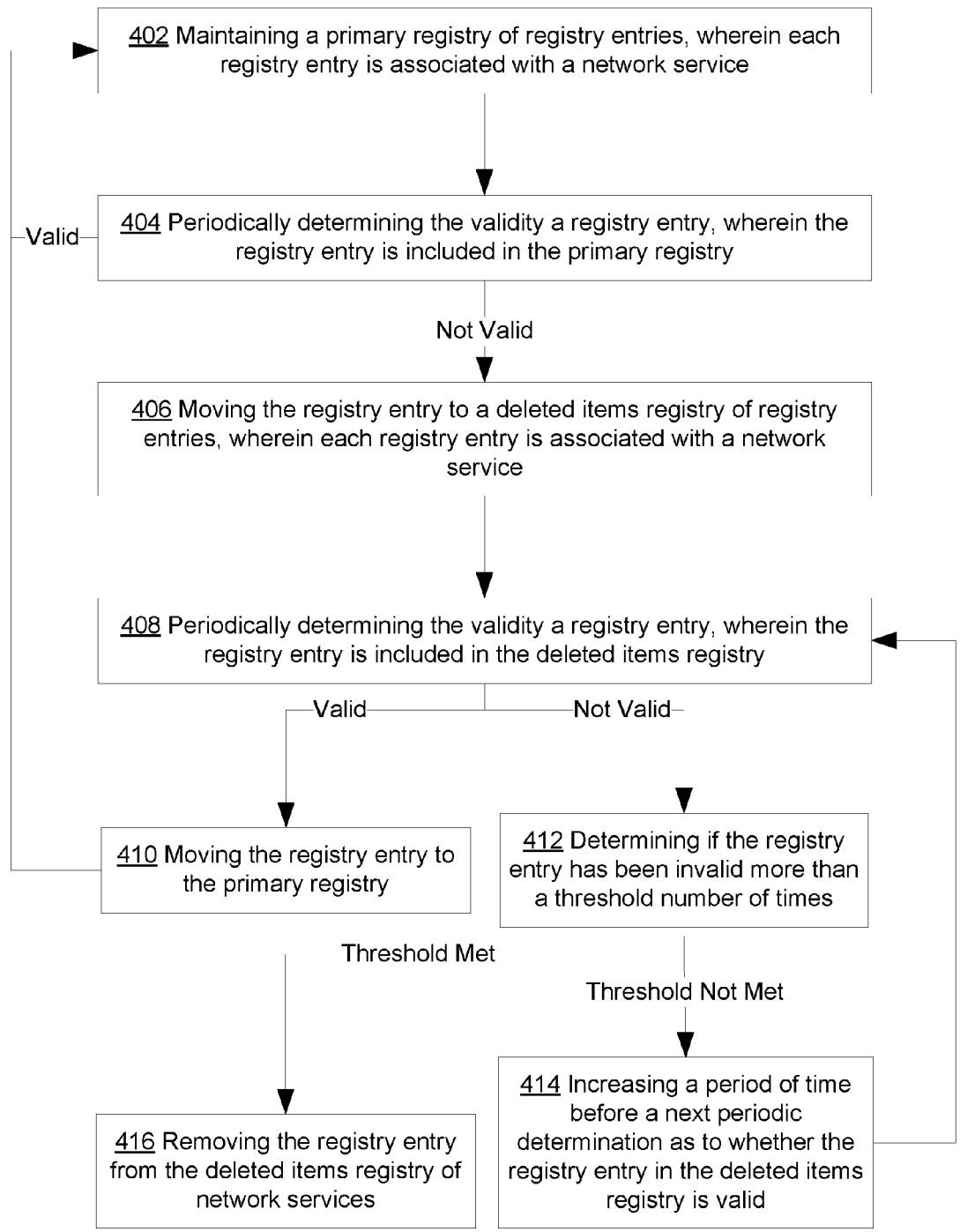

REGISTRY SYNCHRONIZER AND INTEGRITY MONITOR

RELATED APPLICATION

This application is a continuation of U.S. application Ser. No. 13/341,171, filed Dec. 30, 2011, entitled "Registry Synchronizer and Integrity Monitor", the contents of which is hereby incorporated by reference in its entirety.

TECHNICAL FIELD

This description relates to services provided over a communications network, and more specifically to services provided by a network registry.

BACKGROUND

In this context, a "network service" is a software system or application designed to support interoperable machine-to-machine interaction over a communications network. Typically, a server computing device (or aggregated devices) may host a network service that provides information or accomplishes a task in a predefined way (e.g., provide the current temperature for a given location, etc.). Another computing device, such as a client computing device, may make use of this network service (e.g., via a series of messages across a communications network, etc.) to accomplish a task (e.g., find out what the current temperature at a given location is, etc.).

Generally, a network service includes an interface described in a machine-processable format. Often, other computing devices or systems interact with the network service in a manner prescribed by its description using messages, typically conveyed using Hypertext Transfer Protocol (HTTP) or Hypertext Transfer Protocol Secure (HTTPS).

SUMMARY

According to one general aspect, a method may include maintaining a registry of registry entries. Each registry entry may include a description and a network address of a network service. The method may also include determining the validity of a registry entry, wherein the registry entry is included in a deleted items registry, the deleted items registry including registry entries previously determined to be invalid. Upon determining the registry entry is valid, moving the registry entry to a valid items registry. Upon determining the registry entry is invalid, determine if the registry entry has been invalid more than a threshold number of times, upon determining the registry entry has not been invalid more than the threshold number of times, increase a period of time before a next determination as to whether the registry entry in the deleted items registry is valid, and upon determining the registry entry has been invalid more than the threshold number of times, remove the second registry entry from the deleted items registry.

According to another general aspect, an apparatus may include a local memory and a processor. The local memory may be configured to store a primary registry of registry entries, and a deleted items registry of registry entries. Each registry entry may include a description and a network address of a network service. The processor may be configured to execute executable code defining a registry service that: maintains the primary registry of registry entries, periodically determines the validity a registry entry, wherein the registry entry is included in the primary registry, and, if the registry entry is not valid, moves the registry entry to the deleted items registry of registry entries.

According to another general aspect, a computer program product for validating information may exist. The computer program product may be tangibly embodied on a computer-readable medium and include executable code. When executed, the executable code may cause a registry apparatus to maintain a primary registry of registry entries. Each registry entry may include a network service description and a network service network address. The executable code may also cause the apparatus to periodically determine the validity a registry entry included in the primary registry. The executable code may further cause the apparatus to, if the registry entry is not valid, move the registry entry to a deleted items registry of registry entries.

The details of one or more implementations are set forth in the accompanying drawings and the description below. Other features will be apparent from the description and drawings, and from the claims.

A system and/or method for registration of network services, substantially as shown in and/or described in connection with at least one of the figures, as set forth more completely in the claims.

BRIEF DESCRIPTION OF THE DRAWINGS

FIG. 3 is a block diagram of an example embodiment of registry entries in accordance with the disclosed subject matter.

FIG. 4 is a flowchart of an example embodiment of a technique in accordance with the disclosed subject matter.

Like reference symbols in the various drawings indicate like elements.

DETAILED DESCRIPTION

Figure 1:
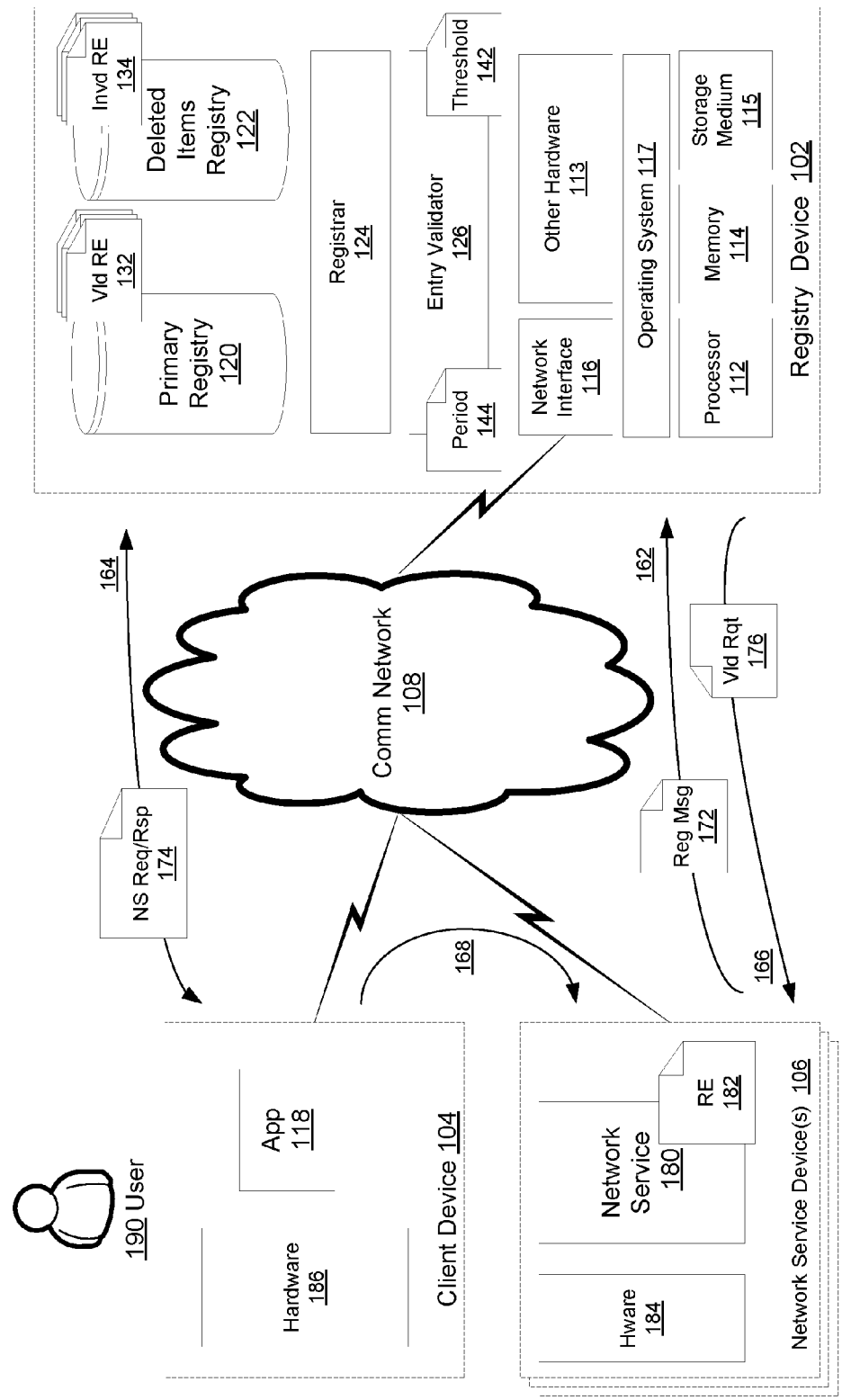
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include a registry device 102. In one embodiment, the system 100 may also include one or more network service devices 106. However, in some embodiments, the system 100 may also include client computing device 104 and/or a user 190. In various embodiments, these devices 102, 104, and 160 may communicatively coupled via communications network 108 (e.g., the Internet, an intranet, etc.).

In various embodiments, the registry device 102, the client device 104, and/or the network service device(s) 106 may each include a computing device, such as, for example, one or more server computing devices. However, in various embodiments, the registry device 102 may include a shared computing terminal, a thin client, a desktop personal computer, a laptop, a netbook, a tablet, a smartphone, etc. or a virtual machine or appliance thereof.

In various embodiments, the registry device 102 may include a processor 112 configured to execute one or more machine executable instructions or pieces of software, firmware, or a combination thereof. The registry device 102 may include, in some embodiments, a memory 114 configured to store on or more pieces of data, either temporarily, permanently, semi-permanently, or a combination thereof. Further, the memory 114 may include volatile memory, non-volatile memory or a combination thereof. In various embodiments, the registry device 102 may include a storage medium 115 configured to store data in a semi-permanent or substantially permanent form. In various embodiments, the storage medium 115 may be included by the memory 114.

In various embodiments, the registry device 102 may include one or more network interfaces 116 configured to allow the registry device 102 to be part of and communicate via a communications network 108. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the registry device 102 may include one or more other hardware components 113 (e.g., a display or monitor, a keyboard, a touchscreen, a camera, a fingerprint reader, a video processor, etc.). It is understood that the above are merely a few illustrative examples to which the disclosed subject matter is not limited.

In various embodiments, the registry device 102 may include an operating system (OS) 117 configured to provide one or more services to an application (e.g., registrar 124, etc.) and manage or act as an intermediary between the application and the various hardware components (e.g., the processor 112, a network interface 116, etc.) of the registry device 102. In such an embodiment, the registry device 102 may include one or more native applications, which may be installed locally (e.g., within the storage medium 115, etc.) and configured to be executed directly by the processor 112 and directly interact with the OS 117.

In various embodiments, the system 100 may include or be in communication with one or more network service devices 106. In such an embodiment, the network service device 106 may include various hardware components 184 analogous to those described in relation to the registry device 102, as described above. In one embodiment, the network service device 106 may provide or may execute a network service 180. In a specific embodiment, the network service 180 may include a web service. In various embodiments, the network service 180 may perform various functions, such as providing information, receiving information, or a combination thereof. Example, network services 180 may include providing a weather report, storing information (e.g., a database, a cloud data backup, etc.), currency conversion, database lookups (e.g., Customer relationship management data, inventory status, etc.), insurance quote, electronic payment or funds transfer, package shipment tracking, etc. It is understood that the above are merely a few illustrative examples to which the disclosed subject matter is not limited.

In a specific embodiment, the network service 180 may include a web service. In various embodiments, other forms of a network service 180 may use or employ one or more of the following technologies or be substantially compliant with the followings standards: Extensible Markup Language (XML), JavaScript Object Notation (JSON), Simple Object Access Protocol (SOAP), and/or a Representational state transfer (REST)-ful web service, etc. In various embodiments, the network service 180 may be accessed via one or more of the following technologies or be substantially compliant with the followings standards: Common Object Request Broker Architecture (CORBA), Distributed System Object Model (DSOM), Distributed Component Object Mode (DCOM), Remote Procedure Calls (RPC), and/or an Application Programming Interface (API) provided by the network service, etc. It is understood that the above are merely a few illustrative examples to which the disclosed subject matter is not limited.

In various embodiments, the network service 180 may announce itself or register itself with the registry device 102 or more specifically the primary registry 120. In such an embodiment, the network service 180 (as indicated by arrow 162) may transmit a registration message 172 to the registry device 102. In various embodiments, this registration message 172 may include a registry entry (RE) 182. In such an embodiment, the registry entry 182 may include a description of the network service 180 (e.g., a human readable name, a set of functions or services that may be performed by the network service 180, etc.) and a network address at which the network service 180 may be accessed (e.g., an Internet Protocol (IP) address, a port number, a Uniform Resource Locator (URL), etc.).

In a specific embodiment in which the network service 180 is embodied as a web service, the RE 182 or registration message 172 may include a Web Services Description Language (WSDL) compliant message. In such an embodiment, the RE 182 or registration message 172 may merely include a message that is substantially compliant with the WSDL standard. In some embodiments, the RE 182 or the registration message 172 may include an XML description of the network service 180. In various embodiments, other public or private description or RE formats may be used. It is understood that the above is merely one illustrative example to which the disclosed subject matter is not limited.

In various embodiments, the RE 182 may be received by a registrar 124 that is configured to add, change, or delete REs 132 from the primary registry 120. In some embodiments, the registrar 124 may also do this for the deleted items registry 122. In another embodiment, this may be performed by the entry validator 126, as described below. In one embodiment, the registrar 124 may be configured to be the interface to the primary registry 120 by processing registration messages 172 from the network service device 106 and network service inquiries or requests 174 from the client device 104, as described below.

In such an embodiment, the registrar 124 may take the RE 182 (or translate some or all of the information included in the registration message 172 into a RE 132) and enter its information into the primary registry 120 as a RE 132. In various embodiments, the primary registry 120 may be configured to maintain a list or database of network services 180, the function or services they provide and/or names, and how to access them (e.g., their network addresses, URLs, etc.). In such an embodiment, the primary registry 120 may maintain this list via a series of REs 132, each associated with a respective network service 180. In the illustrated embodiment, the primary registry 120 may include only valid REs 132.

In the illustrated embodiment, the system 100 may include or be used by a client device 104 that may be used by e user 190. In another embodiment, the client device 104 may be a server or other "back-end" computing device that is not used directly by a user 190. It is understood that the above are merely a few illustrative examples to which the disclosed subject matter is not limited.

As described above, the client device 104 may include various hardware components 186 analogous to those described in relation to the registry device 102, as described above. In one embodiment, the client device 104 may include or may execute an application 118. In such an embodiment, the application 118 may include pre-compiled machine executable code. In some embodiments, the application 118 may include a script interpreter (e.g., C shell (csh), AppleScript, AutoHotkey, etc.) or a virtual machine (e.g., the Java Virtual Machine, the Microsoft Common Language Runtime, etc.) that are configured to translate source or object code into executable code which is then executed by a processor (included by hardware 186). It is understood that the above are merely a few illustrative examples to which the disclosed subject matter is not limited.

In the illustrated embodiment, the application 118 may desire to make use of a network service that performs the function provided by network service 180. In such an embodiment, the application 118 may communicate (illustrated by arrow 166) with the registry device 102. The client device 104 may send a network service request message to the registry device 102 that asks for a particular network service. The registrar 124 may examine the primary registry 120 and determine if a given network service (e.g., network service 180, etc.) will fulfill the client device 104's request. If so, the registrar 124 may respond back with a network service response (illustrated by request/response pair 174) that includes information pertaining to the desired network service 180 (e.g., the RE 132, the network address, etc.). The application 118 may then directly contact the network service 180 (illustrated by arrow 168) and make use of the function or service provided by network service 180.

However, in various embodiments, the information in the primary registry 120 may be out of date, inaccurate, or otherwise invalid. For example, a network service device 106 may go offline or otherwise be removed from the communications network 108; a network service 180 may be rebooted, crash, or otherwise become unresponsive, etc. It is understood that the above are merely a few illustrative examples to which the disclosed subject matter is not limited. In such an embodiment, the network service response may include information that, if relied upon, will cause the interaction (arrow 168) between the application 118 and the network service 180 to fail. In this context, a RE is considered invalid if it includes information that is likely to cause the interaction (arrow 168) between the application 118 and the network service 180 to fail.

In the illustrated embodiment, the registry device 102 may include an entry validator 126 that is configured to periodically test the validity of the information or at least a portion thereof of the REs 132 included or stored within the primary registry 120.

In such an embodiment, the entry validator 126 may periodically send a validation request 176 to the network service 180 or the network service device 106 (illustrated by arrow 166). In one embodiment, the validation request 176 may verify the availability of the network service 180. In one such embodiment, this verification of ability may include the use of the network management tool known as "ping". It is understood that the above is merely one illustrative example to which the disclosed subject matter is not limited. In various embodiments, the validation request message 176 may include more complex network testing operations (e.g., pathping, traceroute, etc.) that also test latency, network routing, or other network performance metrics. In another embodiment, the validation request message 176 may include an attempt by the registry device 102 to make use of the one or more functions provided by the network service 180. In such an embodiment, the entry validator 126 may expect the attempt to employ the network service 180 to fail, but to fail in a known or expected way (e.g., an invalid password error as opposed to a network timeout error, etc.). In yet another embodiment, the entry validator 126 may employ a testing technique that provides a more rigorous test than simply verifying the availability of the network service but yet less than attempt to employ the network service 180. It is understood that the above are merely a few illustrative examples to which the disclosed subject matter is not limited.

In such an embodiment, if the entry validator 126, using a predefined set of validation criteria, determines that the network service 180 or its corresponding RE 132 is valid the entry validator 126 may do nothing until the next periodic validation time. In another embodiment, the entry validator 126 may make note of the success or record a metric or statistic 136 indicating the validation and/or criteria used to make the determination as to validity, as described below.

However, in such an embodiment, if the entry validator 126 determines that the RE 132 is invalid or not valid (e.g., a failure to connect to the network service 180, etc.), the entry validator 126 may remove the RE 132 from the primary registry 120 and add or place the RE 134 in a deleted items registry 122.

In various embodiments, the registry device 102 may include a secondary or deleted items registry 122. In such an embodiment, the deleted items registry 122 may be configured to maintain a list or database of REs 134 that have been deemed to be invalid or otherwise undesirable to inclusion in the primary registry 120. As opposed to the REs 132 in the primary registry 120 that are given out to client devices 104 (e.g., network service request/response 174), the REs 134 are not given out to client devices 104. Instead, the REs 134 may be maintained for re-inclusion into the primary registry 120 if they REs are only temporarily invalid (e.g., heavy load on the network service device 106, congestion in the communications network 108, etc.). It is understood that the above is merely one illustrative example to which the disclosed subject matter is not limited.

In such an embodiment, the entry validator 126 may periodically re-check the validity of the invalid REs 134 stored within the deleted items registry 122. In various embodiments, it may do this by re-sending the validation request 176, as described above. In another embodiment, other validation techniques or criteria may be employed.

In various embodiments, if the entry validator 126 determines that the invalid RE 134 is now valid (e.g., passed a second or subsequent validation test, etc.), the entry validator 126 may move (e.g., add and delete, etc.) the RE 134 from the deleted items registry 122 to the primary registry 120. Once in the primary registry 120 the RE 132 may then be given out or used as any other normal (e.g., via a network service request-response pair 174, etc.).

In various embodiments, this may save the network service device 106 the task of re-registering (via the registration message 172) the network service 180 after a period of inactivity. In various embodiments, if the network service 180 does perform a registration of the network service 180 before the invalid RE 134 has been re-tested (e.g., the period between periodic tests or determinations has not passed, etc.), the entry validator 126 or registrar 124 may remove the corresponding invalid RE 134 from the deleted items registry 122. It is understood that the above is merely one illustrative example to which the disclosed subject matter is not limited.

In some embodiments, if the entry validator 126 determines that the invalid RE 134 is still invalid, the entry validator 126 may adjust the period 144 between validation tests. In one such embodiment, the period 144 between validation tests may increase based upon the number of contiguous invalid determinations. For example, a first period 144 may be one millisecond, then one second, then one minute, then one hour, the one day, etc. In various embodiments, the period 144 may reset to a default value if the RE 134 is determined to be valid, or a RE 132 is moved to the deleted items registry 122 even if the RE 132 had previously been on the deleted items registry. It is understood that the above is merely one illustrative example to which the disclosed subject matter is not limited.

In various embodiments, the entry validator 126 may maintain a threshold 142 that dictates the number of times in a row (or, in one embodiment, in total) a network service or RE may be determined to be invalid. In such an embodiment, once the RE 134 has been viewed as invalid greater than and/or equal to this threshold 142 the RE 134 may be removed from the deleted items registry 122. In various embodiments, this threshold 142 may differ for each network service, class of network service, network address associated with the network services, or other criteria. It is understood that the above are merely a few illustrative examples to which the disclosed subject matter is not limited.

In various embodiments, the registry device 102 may be incorporated with or the same device as the client device 104 or one or more of the network services devices 106. In some embodiments, the communications network 108 may include an intranet, and system 100 need not include devices scattered across the Internet. It is understood that the above are merely a few illustrative examples to which the disclosed subject matter is not limited.

Figure 2:
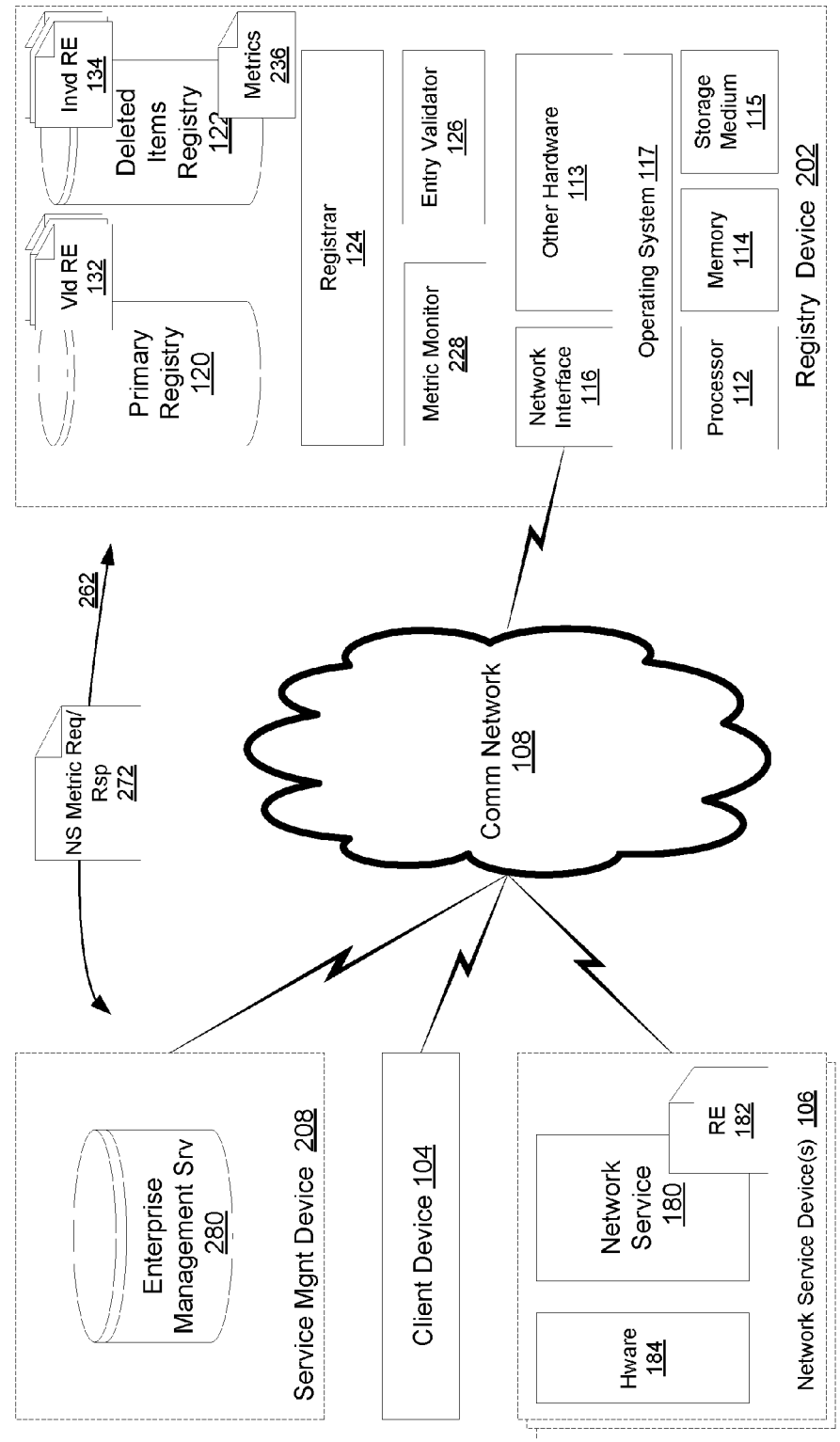
FIG. 2 is a block diagram of an example embodiment of a system in accordance with the disclosed subject matter.

FIG. 2 is a block diagram of an example embodiment of a system 200 in accordance with the disclosed subject matter. In one embodiment, the system 200 may include a registry device 202. In one embodiment, the system 200 may also include one or more network service devices 106. However, in some embodiments, the system 200 may also include client computing device 104. In the illustrated embodiment, the system 200 may also include a service management device 208. In various embodiments, these devices 208, 202, 104, and 160 may communicatively coupled via communications network 108 (e.g., the Internet, an intranet, etc.).

In one embodiment, the registry device 202 may include a statistics or metrics monitor 228. In such an embodiment, the metrics monitor 228 may maintain a set of metrics or statistics 236 regarding each network service or RE 134. In various embodiments, these metrics 236 may be stored in the deleted items registry 122 or separately (e.g., in the storage medium 115, metrics monitor 228, etc.). In such an embodiment, the metrics 236 may include a failure rate for the network service, latency or other network performance information gathered as part of the validation tests, the time of date, week, or month when the respective validation tests were performed, etc. It is understood that the above are merely a few illustrative examples to which the disclosed subject matter is not limited.

In one embodiment, the system 200 may include or be used by a service management device (SMD) 208. In such an embodiment, the service management device 208 may be configured to facilitate the monitoring and management of a communications network 108 or enterprise information technology (IT) infrastructure, or portion thereof. In one embodiment, the service management device 208 may include an enterprise management service 280. It is understood that the above is merely one illustrative example to which the disclosed subject matter is not limited.

In the illustrated embodiment, the SMD 208 may request access to some or all of the metrics 236. In such an embodiment, the SMD 208 may transmit a network services (NS) metric request to the registry device 202 (illustrated by arrow 262). In various embodiments, the metric monitor 228 may receive the NS Metric request, process the desired information from the metrics 236, and respond with a NS Metric Response (illustrated by NS Metric Request-Response pair 272). In various embodiments, the metrics 236 or the portion included by the NS Metric Response may be employed to automatically ameliorate one or more network or IT problems or issues. It is understood that the above is merely one illustrative example to which the disclosed subject matter is not limited.

In various embodiments, the collection of the metrics 236 may be performed by the entry validator 126 or other portion of the registry device 202 or registry device 102 of FIG. 1. In some embodiments, the SMD 208 may be incorporated, in whole or part, with the registry device 202 or other devices (e.g., devices 104 or 106). It is understood that the above are merely a few illustrative examples to which the disclosed subject matter is not limited.

FIG. 3 is a block diagram of an example embodiment of entries 392 and 394 in accordance with the disclosed subject matter. In one embodiment, a registry device may store or maintain two or more registries, as described above, that store registry entries. FIG. 3 illustrates two examples of such network service entities. It is understood that the above are merely a few illustrative examples to which the disclosed subject matter is not limited.

RE 392 illustrates the fields that may be included within one RE stored within a primary registry of network services. In one embodiment, the RE 392 may include a field 302 for storing the name of the respective network service (NS). In one embodiment, the RE 392 may include a field 304 configured to store a description of the functions or services provided by the network service. In various embodiments, the RE 392 may include a field 306 configured to store the network address (e.g., an IP address, etc.) where the network service may be reached or accessed. In some embodiments, the RE 392 may include a field 308 that describes or stores a port number (e.g., 80, 8080, 443, 21, etc.) where the network service may be reached or accessed. In some embodiments, the network address and/or port fields 306 and 308 may be combined or may include a URL or Uniform Resource Identifier (URI), etc.

It is understood that the above is merely one illustrative example to which the disclosed subject matter is not limited. In various embodiments, other formats and fields for RE 392 may be employed. In one specific example, in which the network service is embodied as a web service, a RE substantially in compliance with a version of the WSDL standard may be employed. In such an embodiment, the RE may include fields for: service, endpoint, binding, interface, operations, and types. It is understood that WSDL is merely one illustrative example to which the disclosed subject matter is not limited.

RE 394 illustrates the fields that may be included within one RE stored within a deleted items registry of network services. In one embodiment, the RE 394 may include the RE 392, in whole or part (e.g., fields 302, 304, 306, and 308, etc.). In some embodiments, the RE 394 may also include a field 310 configured to store the number or times the registry device has attempted (and failed) to validate the respective network service or RE 394. In various embodiments, the RE 394 may include a field 312 configured to store the period of time before the next validation attempt by the registry device. In one embodiment, the field 312 may store the time of the next validation attempt (e.g., 8:02 pm, etc.), the time until the next valid attempt (e.g., 864 milliseconds, etc.), the time of the last validation attempt (e.g., 8:00 pm, etc.), or another value used to determine when the next periodic validation determination or attempt should occur. In various embodiments, the RE 394 may also include one or more fields 314 configured to store validation metrics or statistics, as described above. It is understood that the above are merely a few illustrative examples to which the disclosed subject matter is not limited.

In the illustrated embodiment, the deleted items registry's RE 394 may include additional fields than are not found in the primary registry's RE 392. In various embodiments, one or more of these fields may be stored separately from the RE 394. For example, one or more of these values may be stored by the entry validator or metric monitor, etc.

In various embodiments, these REs 392 and 394 may be stored in a text-based format (e.g., XML, JSON, etc.) or a binary format (e.g., compressed format, integer and character encoding, database entry, etc.). In various embodiments, one of more of the described fields may include sub-fields (e.g., each function or service provided by the network service may be associated with a respective sub-field or portion of the port field 308, etc.).

FIG. 4 is a flow chart of an example embodiment of a technique in accordance with the disclosed subject matter. In various embodiments, the technique 400 may be used or produced by the systems such as those of FIG. 1 or 2. Furthermore, portions of technique 400 may be used with registry entries such as that of FIG. 3. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a primary registry of registry entries (REs) may be maintained, as described above. In various embodiments, the registry entry may be associated with a network service, as described above. In some embodiments, the registry entry may include a description and a network address of the network service, as described above. In various embodiments, one or more of the action(s) illustrated by this Block may be performed by the apparatuses or systems of FIG. 1 or 2, the registry device and/or the registrar of FIGS. 1 and 2, as described above.

Block 404 illustrates that, in one embodiment, the validity of a registry entry included by the primary registry determined on a periodic basis, as described above. In various embodiments, determining may include recording the results of the periodic determinations, as described above. In some embodiments, determining may include providing the recorded results to a monitoring apparatus, as described above. In one embodiment, determining may include attempting to make use of the network service associated with the registry entry, as described above. In another embodiment, determining may include attempting to connect with a network address of the network service associated with the registry entry, as described above. In various embodiments, one or more of the action(s) illustrated by this Block may be performed by the apparatuses or systems of FIG. 1 or 2, the registry device, the primary registry, the deleted items registry, and/or the entry validator of FIGS. 1 and 2, and/or the metric monitor of FIG. 2, as described above.

Block 406 illustrates that, in one embodiment, if the registry entry is not valid, the registry entry may be moved to a deleted items registry of registry entries, as described above. In various embodiments, if the registry entry is valid, it may remain within the primary registry, as described above. In various embodiments, one or more of the action(s) illustrated by this Block may be performed by the apparatuses or systems of FIG. 1 or 2, the registry device, the primary registry, the deleted items registry, and/or the entry validator of FIGS. 1 and 2, as described above.

Block 408 illustrates that, in one embodiment, the validity of a registry entry included by the deleted items registry determined on a periodic basis, as described above. In various embodiments, determining may include adjusting a period of time in between the periodical determination based upon a heuristic procedure, as described above. In various embodiments, one or more of the action(s) illustrated by this Block may be performed by the apparatuses or systems of FIG. 1 or 2, the registry device, the primary registry, the deleted items registry, and/or the entry validator of FIGS. 1 and 2, as described above.

Block 410 illustrates that, in one embodiment, if it is determined that the registry entry within the deleted items registry is valid, that the registry entry may be moved to the primary registry, as described above. In various embodiments, one or more of the action(s) illustrated by this Block may be performed by the apparatuses or systems of FIG. 1 or 2, the registry device, the primary registry, the deleted items registry, and/or the entry validator of FIGS. 1 and 2, as described above.

Block 412 illustrates that, in one embodiment, if it is determined that the registry entry within the deleted items registry is not valid, it may be determined if the registry entry has been invalid more than a threshold number of times, as described above. In various embodiments, the threshold may be an inclusive threshold in which the criteria is met if the registry entry has been invalid more than or equal to a threshold number of time. In some embodiments, determining may include counting down to a number (e.g., zero, etc.). In another embodiment, determining may include counting up to a predefined value (e.g., a threshold value, etc.). It is understood that the above are merely a few illustrative examples to which the disclosed subject matter is not limited. In various embodiments, one or more of the action(s) illustrated by this Block may be performed by the apparatuses or systems of FIG. 1 or 2, the registry device, the threshold, and/or the entry validator of FIGS. 1 and 2, as described above.

Block 414 illustrates that, in one embodiment, if the threshold value has not been met, a period of time before a next periodic determination as to whether the registry entry in the deleted items registry of web service is valid may be adjusted and/or increased, as described above. In various embodiments, this adjustment may be based upon a heuristic scheme or technique, as described above. In various embodiments, one or more of the action(s) illustrated by this Block may be performed by the apparatuses or systems of FIG. 1 or 2, the registry device, the period, and/or the entry validator of FIGS. 1 and 2, as described above.

Block 416 illustrates that, in one embodiment, if a threshold value has been met, the registry entry may be removed or deleted from the deleted items registry of network services, as described above. In various embodiments, one or more of the action(s) illustrated by this Block may be performed by the apparatuses or systems of FIG. 1 or 2, the registry device, the deleted items registry, and/or the entry validator of FIGS. 1 and 2, as described above.

In various embodiments, during some or all portions of technique 400 a set of statistics or metrics, based upon the periodic determining of the validity of the registry entry may be compiled, as described above. In various embodiments, one or more of the action(s) illustrated by this Block may be performed by the apparatuses or systems of FIG. 1 or 2, the registry device, the primary registry, the deleted items registry, and/or the entry validator of FIGS. 1 and 2, and/or the metric monitor of FIG. 2, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   determining the validity of a registry entry, wherein the registry entry is included in a deleted items registry, the deleted items registry including registry entries previously determined to be invalid;
   upon determining the registry entry is valid, moving the registry entry to a valid items registry; and
   upon determining the registry entry is invalid,
      determine if the registry entry has been invalid more than a threshold number of times,
      upon determining the registry entry has not been invalid more than the threshold number of times, and
      upon determining the registry entry has been invalid more than the threshold number of times, remove the registry entry from the deleted items registry.

2. The method of claim 1, wherein the determining of the validity of a registry entry is repeated over time intervals based on a heuristic procedure.

3. The method of claim 1, wherein the determining of the validity of a registry entry includes:
   recording the results of the determinations; and
   providing the recorded results to a monitoring apparatus.

4. The method of claim 1, further comprising compiling a set of statistics, based upon the results of determining of the validity of the registry entry.

5. The method of claim 1, wherein the determining of the validity of a registry entry includes attempting to make use of the network service associated with the registry entry.

6. The method of claim 1, wherein the determining of the validity of a registry entry includes attempting to connect with a network address of the network service associated with the registry entry.

7. An apparatus comprising:
   a local memory configured to store a deleted items registry of registry entries, each registry entry includes a description and a network address of a network service; and
   a processor configured to execute executable code defining a registry service that:
      determines the validity of a registry entry, wherein the registry entry is included in the deleted items registry, the deleted items registry including registry entries previously determined to be invalid;

upon determining the registry entry is valid, moving the registry entry to a valid items registry; and upon determining the registry entry is invalid,
  determine if the registry entry has been invalid more than a threshold number of times,
    upon determining the registry entry has not been invalid more than the threshold number of times, and
    upon determining the registry entry has been invalid more than the threshold number of times, remove the registry entry from the deleted items registry.

8. The apparatus of claim 7, wherein the registry service is configured to repeat the determining of the validity of a registry entry over time intervals based on a heuristic procedure.

9. The apparatus of claim 7, wherein the registry service is configured to:
  record the results of the determinations; and
  provide the recorded results to a monitoring apparatus.

10. The apparatus of claim 7, wherein the registry service is configured to compile a set of statistics, based on the determining of the validity of the registry entry.

11. The apparatus of claim 7, wherein the registry service is configured to determine the validity of a registry entry by attempting to make use of the network service associated with the registry entry.

12. The apparatus of claim 7, wherein the registry service is configured to determine the validity of a registry entry by attempting to connect with a network address of the network service associated with the registry entry.

13. A computer program product for validating information, the computer program product being embodied on a non-transitory computer-readable medium and including executable code that, when executed, is configured to cause a registry apparatus to:
  determine the validity of a registry entry, wherein the registry entry is included in a deleted items registry, the deleted items registry including registry entries previously determined to be invalid;
  upon determining the registry entry is valid, moving the registry entry to a valid items registry; and
  upon determining the registry entry is invalid,
    determine if the registry entry has been invalid more than a threshold number of times,
      upon determining the registry entry has not been invalid more than the threshold number of times, and
      upon determining the registry entry has been invalid more than the threshold number of times, remove the registry entry from the deleted items registry.

14. The computer program product of claim 13, wherein the registry apparatus is configured to repeat the determining of the validity of a registry entry over time intervals based on a heuristic procedure.

15. The computer program product of claim 13, wherein the registry apparatus is configured to:
  record the results of the determinations; and
  provide the recorded results to a monitoring apparatus.

16. The computer program product of claim 13, wherein the registry apparatus is configured to compile a set of statistics based on the periodic determining of the validity of the registry entry.

17. The computer program product of claim 13, wherein the registry apparatus is configured to determine the validity of a registry entry by attempting to make use of the network service associated with the registry entry.

18. The computer program product of claim 13, wherein the registry apparatus is configured to determine the validity of a registry entry by attempting to connect with a network address of the network service associated with the registry entry.

* * * * *